United States Patent
Wu et al.

(10) Patent No.: US 7,965,893 B2
(45) Date of Patent: Jun. 21, 2011

(54) METHOD, APPARATUS AND STORAGE MEDIUM FOR DETECTING CARDIO, THORACIC AND DIAPHRAGM BORDERS

(75) Inventors: Dawei Wu, Beijing (CN); Miao Peng, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 924 days.

(21) Appl. No.: 11/424,346

(22) Filed: Jun. 15, 2006

(65) Prior Publication Data
US 2006/0285751 A1    Dec. 21, 2006

(30) Foreign Application Priority Data
Jun. 15, 2005 (CN) ............ 2005 1 0077098

(51) Int. Cl.
*G06K 9/48* (2006.01)
(52) U.S. Cl. ............ 382/199; 382/132; 382/157
(58) Field of Classification Search ............ 382/128, 382/176, 199, 132
See application file for complete search history.

(56) References Cited

U.S. PATENT DOCUMENTS

| | | | |
|---|---|---|---|
| 5,072,384 A * | 12/1991 | Doi et al. | 382/132 |
| 6,011,862 A * | 1/2000 | Doi et al. | 382/132 |
| 6,282,307 B1 | 8/2001 | Armato, III et al. | 382/132 |
| 6,549,646 B1 * | 4/2003 | Yeh et al. | 382/132 |
| 2004/0109595 A1 * | 6/2004 | Luo et al. | 382/132 |
| 2005/0033139 A1 * | 2/2005 | Li et al. | 600/407 |

OTHER PUBLICATIONS

Hidefumi Kobatake et al, "Convergence index filter for vector fields", Aug. 1999, IEEE Trans. on Image Processing, vol. 8, No. 8, pp. 1029-1038.*
Hua Li and Hyun S. Yang, "Fast and reliable image enhancement using fuzzy relaxation technique", Oct. 1989, IEEE Trans. on SMC, vol. 19, No. 5, pp. 1276-1281.*

* cited by examiner

*Primary Examiner* — Samir A Ahmed
*Assistant Examiner* — Ruiping Li
(74) *Attorney, Agent, or Firm* — Fitzpatrick, Cella, Harper & Scinto

(57) ABSTRACT

The present invention provides a method of detecting borders in a chest image. The method comprises calculating the gray level difference between neighboring pixels of the chest image to get a differential image; filtering the differential image to reduce noise and enhance the target; binarizing the filtered image; picking out the outside edges of the area with high gray level from the binarized image; and determining a final border from the edges according to the character of the border to be found. The present invention also provides an apparatus and a storage medium for implementing the above-mentioned method and a method and an apparatus for automatically measuring the Cardiothoracic Ratio of a chest image.

20 Claims, 9 Drawing Sheets

FIG. 6I      FIG. 6J

METHOD, APPARATUS AND STORAGE MEDIUM FOR DETECTING CARDIO, THORACIC AND DIAPHRAGM BORDERS

FIELD OF THE INVENTION

The present invention relates to image processing, and particularly to a method, an apparatus and a storage medium for detecting cardio, thoracic and diaphragm borders in a chest image.

BACKGROUND OF THE INVENTION

Accurate identification of the lung on chest images provides us not only with information for various lung-related computer-aided diagnosis schemes but also with a useful tool for anatomic region-based image processing and data compression. All edges provide useful information on the location, shape, and size of the lung fields. From this information CAD (Computer-Aided Diagnosis) systems can automatically detect heart's and lung's information and various abnormalities such as interstitial disease, pneumothorax, cardiomegaly and pulmonary nodules.

At present the usual steps to get borders of lung, heart and diaphragm include: get the landmark lines in anatomic sense by the gray level profile; find borders in ROI (Region of Interest) marked by the landmark lines by means of analysis of histogram, edge detection or some other methods based on the gray value difference between the borders and the background. The process is often done iteratively for the more accurate borders. The border will be smoothed by means of fitting functions or some other methods. There will be a lot of experienced data being used in the whole procedure.

U.S. Pat. No. 6,282,307 discloses a method, system, and computer product for the automated segmentation of the lung fields and costophrenic angle regions in posteroanterior chest radiographs wherein image segmentation based on gray-level threshold analysis is performed by applying an iterative global gray-level thresholding method to a chest image based on the features of a global gray-level histogram. Features of the regions in a binary image constructed at each iteration are identified and analyzed to exclude regions external to the lung fields. The initial lung contours that result from this global process are used to facilitate a local gray-level thresholding method. Individual regions-of-interest (ROIs) are placed along the initial contour. Contrast-based information is employed on a column-by-column basis to identify initial diaphragm points, and maximum gray-level information is used on a row-by-row basis to identify initial costal points. Analysis of initial diaphragm and costal points allows for appropriate adjustment of CP angle ROI positioning. Polynomial curve-fitting is used to combine the diaphragm and costal points into a continuous, smooth CP angle delineation. This delineation is then spliced into the final lung segmentation contours.

However, the prior art is complex in calculation, thus is slow in finding the borderlines.

SUMMARY OF THE INVENTION

The object of the present invention is to solve the above technical problem of the prior art and provide a method, apparatus and storage medium for detecting cardio, thoracic and diaphragm borders in a chest image.

According to one aspect of the present invention, a method of detecting borders in a chest image comprises steps of: calculating the gray level difference between neighboring pixels of said chest image to get a differential image; filtering said differential image to reduce noise and enhance target by at least one filter; binarizing the filtered image; picking out the outside edges of the area with high gray level from the binarized image; and determining a final border from said edges according to the character of the border to be found.

According to another aspect of the present invention, an apparatus for detecting borders in a chest image comprises of means for calculating the gray level difference between neighboring pixels of said chest image to get a differential image; means for filtering said differential image to reduce noise and enhance target; means for binarizing the filtered image; means for picking out the outside edges of the area with high gray level from the binarized image; and means for determining a final border from said edges according to the character of the border to be found.

According to yet another aspect of the present invention, a method of automatically measuring the Cardiothoracic Ratio of a chest image comprises steps of: detecting left and right lung borders, left and right diaphragms and left and right heart borders in the chest image by the above-mentioned border finding method; searching for the maximum value TL of left lung border in horizontal direction, the minimum value TR of right lung border in horizontal direction, the maximum value CL of left heart border in horizontal direction and the minimum value CR of right heart border in horizontal direction; and calculating Cardiothoracic Ratio (CTR) of the chest image by the following expression:

$$CTR=(CL-CR)/(TL-TR)*100\%.$$

According to yet another aspect of the present invention, an apparatus for automatically measuring the Cardiothoracic Ratio of a chest image comprises of: means for detecting left and right lung borders, left and right diaphragms and left and right heart borders in the chest image by the above-mentioned border finding method; means for searching for the maximum value TL of left lung border in horizontal direction, the minimum value TR of right lung border in horizontal direction, the maximum value CL of left heart border in horizontal direction and the minimum value CR of right heart border in horizontal direction; and means for calculating Cardiothoracic Ratio (CTR) of the chest image by the following expression:

$$CTR=(CL-CR)/(TL-TR)*100\%.$$

The present invention further provides a storage medium encoded with machine-readable computer program code for detecting borders in a chest image, the storage medium including instructions for causing a processor to implement the method according to the present invention.

According to the method, apparatus and storage medium of the present invention, the borders of interesting in a chest image can be precisely identified. Thus, the borders in a chest image can be used in automatically detecting information about the heart and lungs.

Other features and advantages of the present invention will be clearer from the following description of the preferred embodiments, taken in conjunction with the accompanying drawings, which illustrate, by way of example, the principles of the invention.

BRIEF DESCRIPTION OF THE DRAWINGS

FIG. 6I shows a border selected from the closed curve shown in FIG. 6H;

FIG. 6J shows the selected border on the original chest image;

DETAILED DESCRIPTION OF THE PREFERRED EMBODIMENT

In all the following text, all of the definitions of left and right are from image aspect, which is opposite to the viewer's aspect.

Figure 3:
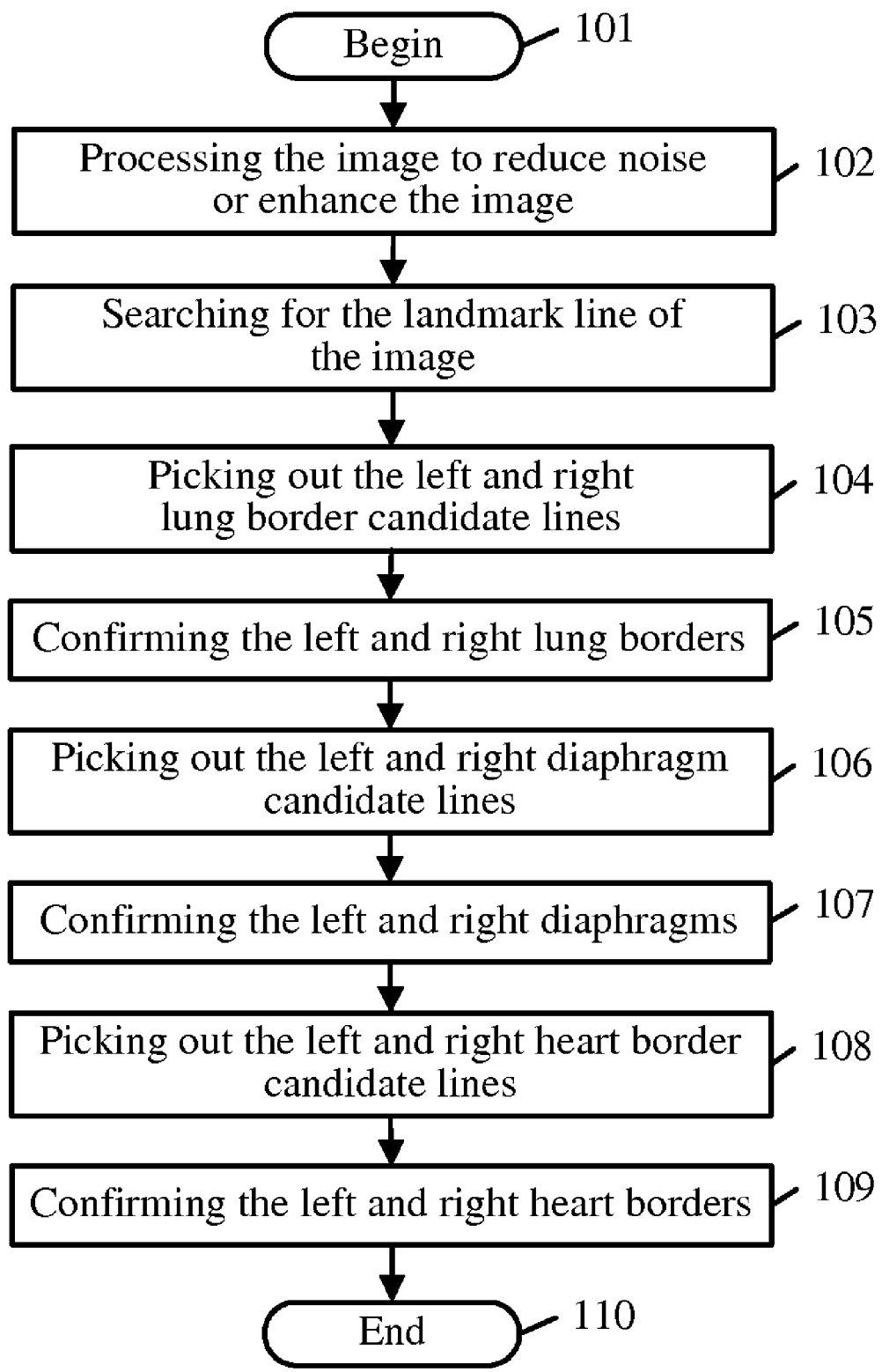
FIG. 3 is a general flow chart of the method of detecting the 6 target borders.

FIG. 3 shows a general flow chart of the method of detecting the six target borders. The method begins at step 101. Then in step 102, a chest image is preprocessed to reduce noise or enhance the image. For example, the chest image is shrunk and smoothed to reduce image noise and equalization to enhance the image.

In step 103, a landmark line of the image is searched. There are a number of methods for searching the landmark. Here, one of those methods is explained.

Figure 1A:
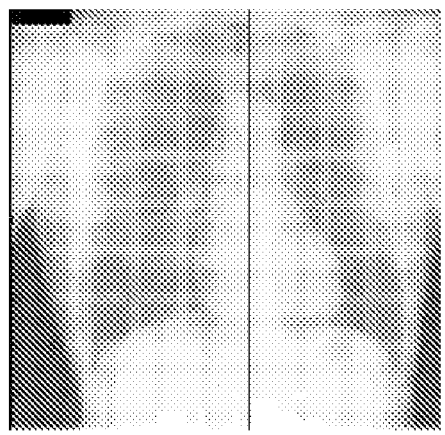
FIG. 1A shows a chest image and its midline.
Figure 1B:
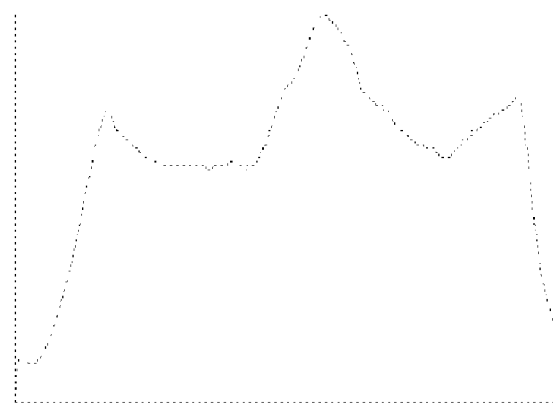
FIG. 1B shows project profile of the chest image of FIG. 1A in the horizontal direction.

FIG. 1A shows a chest image and its midline and FIG. 1B shows project profile of the chest image of FIG. 1A in the horizontal direction. The landmark line here is midline in the image, as shown in FIG. 1A.

Horizontal gray-level profiles are analyzed to determine the location of the midline in each chest image. The midline position is used throughout the scheme to distinguish between right and left hemithoraces.

The project profile in the horizontal direction is gotten, as FIG. 1B shows. The profile has three peaks because of the feature of the lung image. Then the position of middle peak is the landmark line position.

Figure 2:
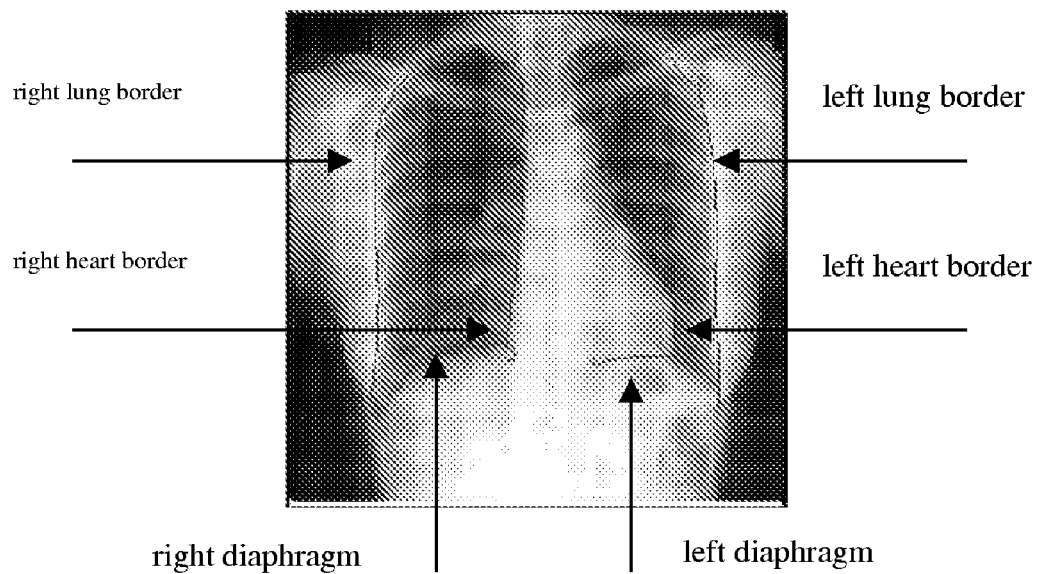
FIG. 2 shows 6 target borders to be found in the chest image, i.e. left lung border, right lung border, left diaphragm, right diaphragm, left heart border and right heart border.

There are six target curves in FIG. 2, which are left lung border, right lung border, left diaphragm, right diaphragm, left heart border and right heart border. The six target curves have mutual recognition relationship in position so the searching sequence is lung border, diaphragm and heart border because of the recognition difficulty level. For every borderline, pick out its candidate lines first and then confirm the right one.

In step 104, the left and right lung border candidate lines are picked out. In step 105, the left and right lung borders are confirmed. In step 106, the left and right diaphragm candidate lines are picked out. In step 107, the left and right diaphragms are confirmed. In step 108, the left and right heart border candidate lines are picked out. In step 109, the left and right heart borders are confirmed. After finding the six border lines, the process ends at step 110.

For finding one of the borders, we get the differential image correlating to the border's direction, because all the six borderlines have the same character that is one side of the border is bright and the other is dark; filter the image by median filter or average filter to reduce the noise; then binarize the image by the threshold according to the image's feature; thereafter judge the pixels in the binary image and only maintain the pixels that have the possibility to be border; then dilate the image to give the border better connectivity; last, pick out the candidate borderlines by edge tracing. After the candidate borderlines are gotten, the correct one will be mainly confirmed by its position and will be rectified. The flowchart is shown in FIG. 4.

Figure 4:
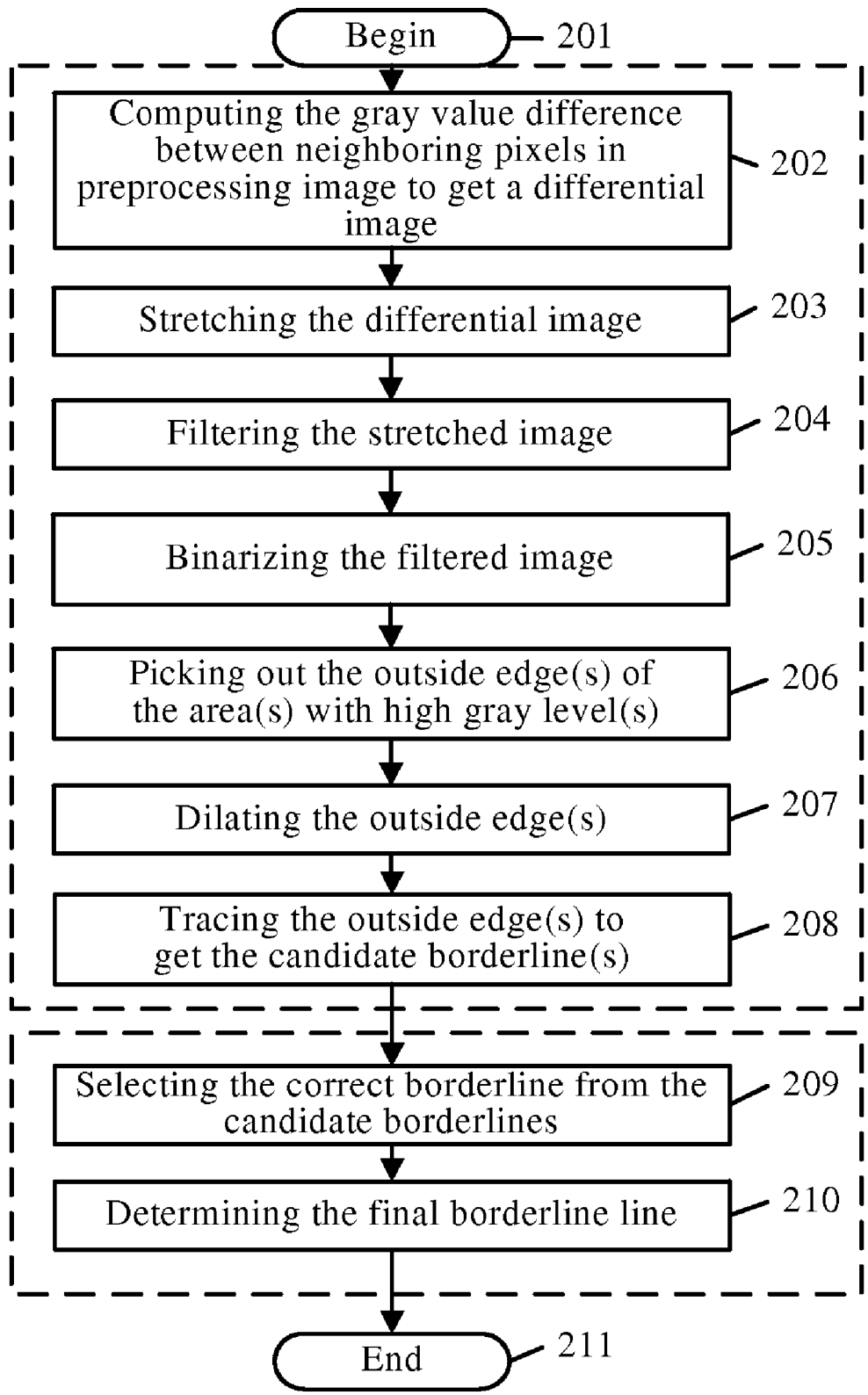
FIG. 4 is a detailed flow chart of the method of detecting one of the target borders according to first embodiment of the present invention.

Though the seeking procedures for six borderlines are same as shown in FIG. 4, there are something different in detail parameters, such as differential direction, matrix size, checking condition, etc., according to the borderlines' own character.

As can be seen from FIG. 4, the flowchart for finding one of the borderlines is divided into two parts. The first part of the flowchart corresponds to each of steps 104, 106 and 108 in FIG. 3. The second part of the flowchart corresponds to each of steps 105, 107 and 109 in FIG. 3.

In order to describe the flowchart of FIG. 4 in detail, reference is made to FIG. 6A-6J. Each figure in FIG. 6A-6J is the intermediate result image gotten from a corresponding respective step in the flowchart of FIG. 4 when finding the left lung border.

Figure 6A:
FIG. 6A is a differential image which demonstrates the result of a differential process applied to the chest image shown in FIG. 1A

The flowchart of FIG. 4 begins in step 201. In step 202, after searching for the midline of the chest image, the gray value difference between neighboring pixels in preprocessing image is computed to get a differential image. In finding the left lung border, as can be seen from the chest image, the left side of the left lung border is brighter than the right side of the left lung border. Therefore, the right pixels (x−1, y) is subtracted by left pixels (x+1, y) in preprocessing image to get the pixels (x, y) in the differential image (the direction of the calculation is defined as from left to right) and the gray value of the differential image is transformed into 0~L gray value space by linear transformation, so as to highlight the left lung border. FIG. 6A is the image resulted from step 202.

Similarly, when finding the right lung border, since the right side of the right lung border is brighter than the left side of the right lung border, the left pixels (x+1, y) is subtracted by the right pixels (x−1, y) in preprocessing image to get the pixels (x, y) in the differential image (the direction of the calculation is defined as from right to left) and the gray value of the differential image is transformed into 0~L gray value space by linear transformation, so as to highlight the right lung border.

That is to say, the differential image is calculated according to the direction of the borderline to be found. If one side of the borderline is brighter, the direction for calculating the gray level difference between neighboring pixels is from the brighter side of the borderline to be found to the darker side.

Figure 6B:
FIG. 6B is a stretched image which demonstrates the result of a stretch process applied to the differential image shown in FIG. 6A.

Step 203 is a stretch step to make the borders more prominent after the differential process. In step 203, the histogram of the differential image is computed to get the maximum value position MP, then the histogram is stretched from (MP~L) to (0~L). FIG. 6B is the image resulting from step 203.

Figure 6C:
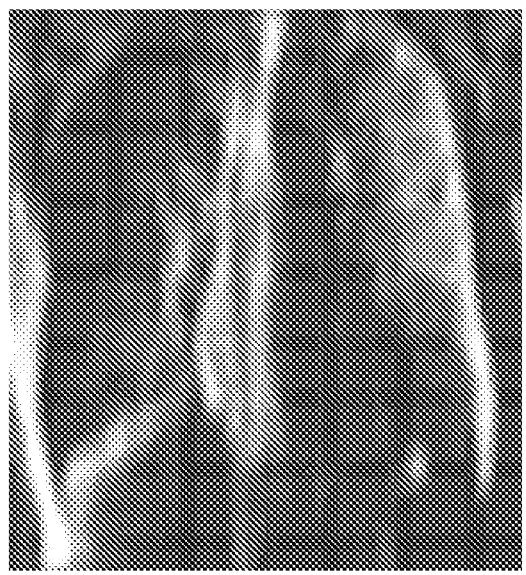
FIG. 6C is a filtered image which demonstrates the result of a filter process applied to the stretched image shown in FIG. 6B.

In step 204, the stretched image is filtered by 3×7 average filter to reduce noise and enhance target. The filter can be an average filter or a medium filter or other filters. And the filters should be chosen according to the border's character. FIG. 6C is the image resulting from step 204.

Figure 6D:
FIG. 6D is a binary image which demonstrates the result of a binarization process applied to the left half of the filtered image shown in FIG. 6C.

In step 205, the left part of the midline is defined as the Region of interest (ROI). A binary threshold is defined according to the average gray value of the ROI. The ROI is binarized in filtered image according to the binary threshold. The rest of the image will be set to 0. FIG. 6D is the image resulting from step 205.

Figure 6E:
FIG. 6E is a border image which demonstrates the result of a morphology operation applied to the binary image shown in FIG. 6D.

In step 206, the outside edges of the areas with high gray levels are picked out, because the targeted left lung border is on the outside edges of one of the high gray level areas. FIG. 6E is the image resulting from step 206.

Since the left lung borderline is located at the left up side of one of the high gray level areas, in order to pick out the outside edges of the high gray level areas, the following method may be taken:

Searching for the pixel which has the following feature: the left pixel of it is 0, the up left or the down left pixel of it is 0, the right pixel of it is 255 and the up right or the down right pixel of it is 255;

Setting the gray level of the searched pixels to 255; and
Setting the pixels which do not have such features to 0.

The above-mentioned method for picking out the outside edges of the high gray level areas is varied according to the character of borders.

For example, when picking out the right lung border, the above-mentioned method would be changed into:

Searching for the pixel which has the following feature: the right pixel of it is 0, the up right or the down right pixel of it is 0, the left pixel of it is 255 and the up left or the down left pixel of it is 255;

Setting the gray level of the searched pixels to 255; and
Setting the pixels which do not have such features to 0.

When picking out the right or left diaphragm border, the above-mentioned method would be changed into:

Searching for the pixel which has the following feature: the up pixel of it is 0, the up right or the up left pixel of it is 0 and the down left or down right pixel of it is 255;

Setting the gray level of the searched pixels to 255; and
Setting the pixels which do not have such features to 0.

When picking out the right heart border, the above-mentioned method would be changed into:

Searching for the pixel which has the following feature: the right pixel or up right or up left pixel of it is 0 and the left pixel of it is 255;

Setting the gray level of the searched pixels to 255; and
Setting the pixels which do not have such features to 0.

When picking out the left heart border, the above-mentioned method would be changed into:

Searching for the pixel which has the following feature: the left pixel or up left or down left pixel of it is 0 and the right pixel of it is 255;

Setting the gray level of the searched pixels to 255; and
Setting the pixels which do not have such features to 0.

Figure 6F:
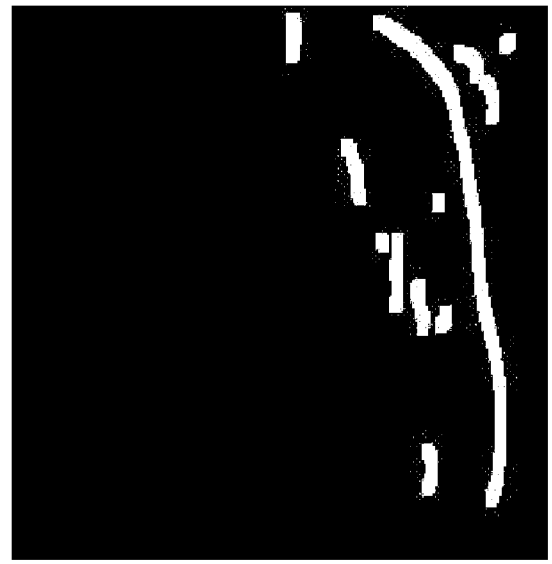
FIG. 6F is a dilated image which demonstrates the result of a dilating process applied to the border image shown in FIG. 6E.

The searched pixels gotten from step 206 form some edges of the high gray level areas. In step 207, the image is dilated by a 3×5 operator to ensure connectivity, because the edges gotten from step 206 may be unconnected. FIG. 6F is the image resulting from step 207.

The operator used for dilating the image may vary according to the character of the borders to be found. For example, when finding the left and right diaphragms, the image is dilated by a 3×3 operator; when finding the right heart diaphragm, the image is dilated by a 3×5 operator; and when finding the left heart diaphragm, the image is dilated by a 3×4 operator.

Figure 6G:
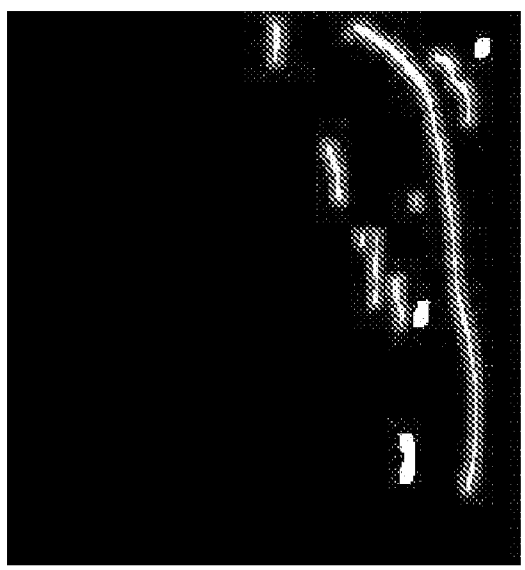
FIG. 6G is a edge traced image which demonstrates the result of a edge tracing process applied to the dilated image shown in FIG. 6F.

In step 208, the dilated outside edges are traced to get the candidate borderlines. The curves obtained here are closed curves as shown in FIG. 6G.

Figure 6H:
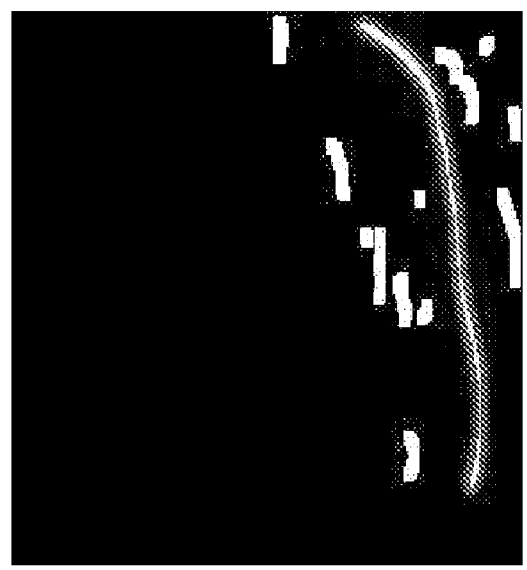
FIG. 6H shows a closed curve selected from the curves in FIG. 6G as the correct border according to the character of the border.

In step 209, the correct borderline is selected from the candidate borderlines according the character of the borderline to be found by eliminating the too long or too short candidates, eliminating the candidate borderlines that don't have the proper position information with the landmark lines or the borderline which have been found. (In terms of the physiologic aspect, the relative position between the ribcage line and the diaphragm line can be referenced. Based on that, it is useful for one of them to confirm the other one. Usually, the ribcage line will be found before the diaphragm line according to the detection difficulty. After that, the ribcage line will be utilized to retrieve the diaphragm line. The heart line is the most difficult one to find, but as the diaphragm line and the heart line's relative position can be referenced too, it is possible to use the found diaphragm line to get the heart line. If the diaphragm line has not been retrieved, the ribcage line will replace the role of the diaphragm to help in finding the heart line. (Because the distance between the ribcage line and the heart line is greater than that between the diaphragm line and the heart line, it will be utilized only when the diaphragm line is not found.)) Then the curve from among the other candidate borderlines that has the most proper position information is chosen to be the correct borderline. For example, when finding the left lung borderline, the correct borderline is selected by deleting the candidates that shorter than an experiential threshold and choosing the closed curve as the correct border if it has the least distance to the midline in horizontal direction of all the left lung candidate borderlines. The correct left lung borderline is shown in FIG. 6H. The correct borderline selected in step 209 is a closed curve.

Another example, when choosing the right heart borderline, if the right diaphragm borderline was detected, the heart borderline will be confirmed by following 3 steps (please see FIG. 8):

1) The height difference Dht, from the heart borderline candidate center ("center" means the point whose coordinate is the average of the coordinates of all points in the borderline) to the right diaphragm borderline center must be not less than 1/32 of the image height.

2) The horizontal difference Dhz, from the heart borderline candidate center to the point that is the nearest point of the diaphragm borderline from the midline must be less than 1/6 of the image width.

3) Filtering by steps 1 and 2, in the remaining candidates, the candidate that includes the lowest point of all remaining candidates will be confirmed as the heart borderline.

But, if the right diaphragm borderline was not detected, the right heart borderline will be confirmed by following two steps based on the right ribcage borderline:

1) The right heart borderline candidate center must be nearer the midline than the right ribcage borderline center.

2) Filtering by step 1, in the remaining candidates, the candidate that includes the nearest point to the lowest point of the ribcage borderline of all remaining candidates will be confirmed as the heart borderline.

In step 210, the selected closed curve is divided into two lines. One of the two lines is selected as the final borderline. In the case of finding the left lung border, the point of the closed curve gotten in step 209, which has the least distance to the top point of the midline, and the bottom point from the closed curve are chosen as the start and end points. The start and end points split the closed curve into two parts. The shorter part is chosen as the final borderline.

The process for finding one borderline terminates at step 211.

Figure 5:
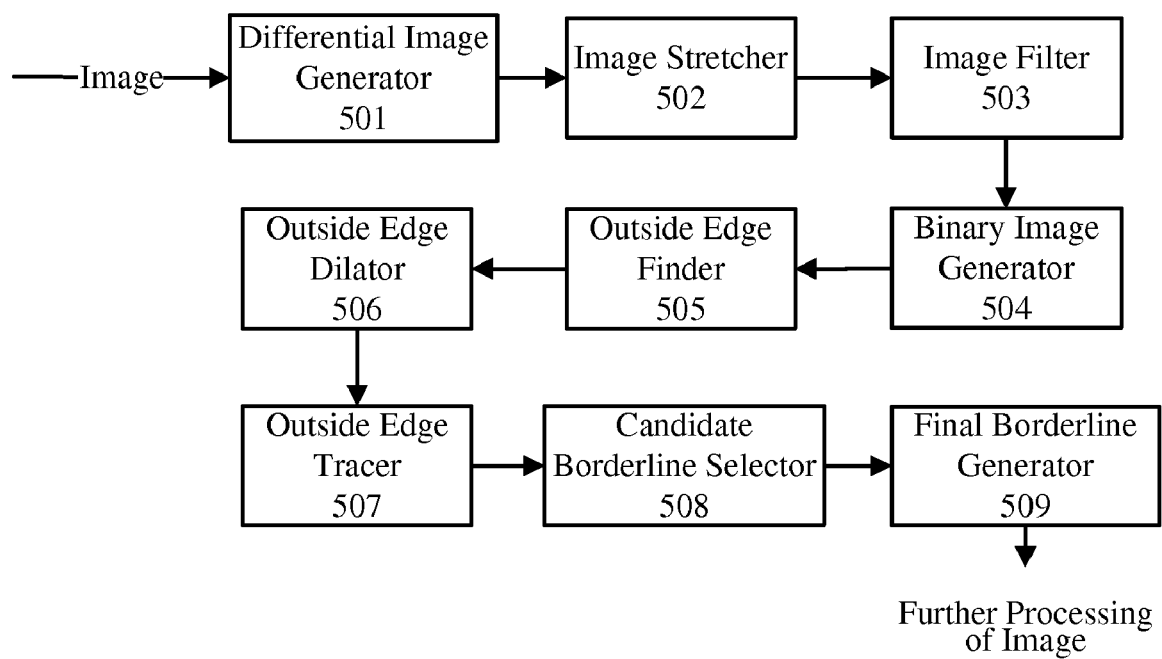
FIG. 5 shows a block diagram of an apparatus for implementing the method of the invention shown in FIG. 4.

FIG. 5 shows a block diagram of an apparatus for implementing the method of the invention shown in FIG. 4.

The apparatus comprises Differential Image Generator 501, Image Stretcher 502, Image Filter 503, Binary Image Generator 504, Outside Edge Finder 505, Outside Edge Dilator 506, Outside Edge Tracer 507, Candidate Borderline selector 508 and Final Borderline Generator 509 connected serially.

After a chest image is input into the apparatus, the Differential Image Generator 501 computes the gray value difference between neighboring pixels in the input image to get a differential image. The differential image is stretched by Image Stretcher 502 to make the borders more prominent after the differential process. The stretched image is filtered by Image Filter 503 to reduce noise and enhance the target. The Binary Image Generator 504 defines a binary threshold according to the average gray value of the ROI and binarizes the filtered image in the ROI according to the binary threshold to get a binarized image. The Outside Edge Finder 505 picks out the outside edges of the areas with high gray levels. The outside edges picked out by the Outside Edge Finder 505 are dilated by Outside Edge Dilator 506 to ensure connectivity, because the edges gotten by Outside Edge Finder 505 may be unconnected. The dilated outside edges are traced by the Outside Edge Tracer 507 to get the candidate borderlines. The Candidate Borderline selector 508 selects the correct borderline from the candidate borderlines according to the character of the borderline to be found by eliminating the too long or too short candidates, eliminating the candidate borderlines that don't have the proper position information with (i.e., the proper position relative to) the landmark lines or the borderline which have been found and choosing the curve in the rest candidate borderlines that has the most proper position information to be the correct borderline which is a closed curve. The Final Borderline Generator 509 divides the closed curve into two lines and chooses one of the two lines as the final borderline.

Above, the method and apparatus for finding one borderline in a chest image has been described in detail. When the method and apparatus are used to find lung borders, diaphragms and heart border, some parameters (such as the direction for performing differential calculation, the filter used in the filtering step, the criterion for picking out the edges and the operator for dilating the edges) for each steps or components shall be changed adaptively according to the character of the borderlines to be found.

Figure 7:
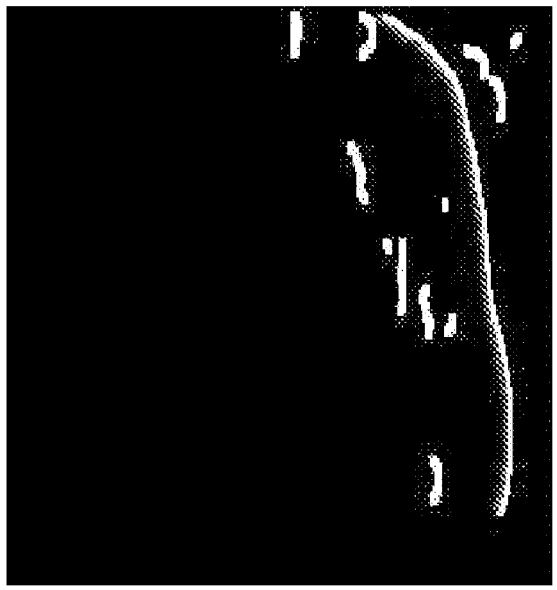
FIG. 7 shows an application of the present invention.
Figure 7:
Figure 7:
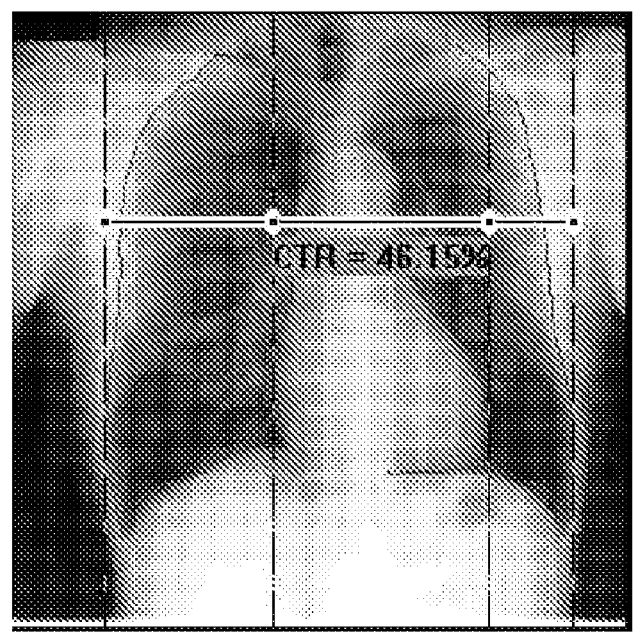

FIG. 7 shows an application of the present invention. As can be seen from FIG. 7, the six borderlines are found on a chest image. Those borderlines can be used in automated CTR (Cardiothoracic Ratio) measurement or other clinical treatment with heart and lung. When measuring CTR value, the maximum value TL of left lung border in horizontal direction, the minimum value TR of right lung border in horizontal direction, the maximum value CL of left heart border in horizontal direction and the minimum value CR of right heart border in horizontal direction shall be searched. Then CTR is calculated by the following expression:

$$CTR=(CL-CR)/(TL-TR)*100\%$$

In the chest image of FIG. 7, the calculated CTR is equal to 46.15%.

The inventor tested the method with about 150 chest images (including clear and not clear images). The result is fairly good, as can be seen in the following table, and the processing time is very fast.

Grade Standard:

| | |
|---|---|
| 5 | No Problem |
| 4.5 | Detect part of the line but we can get the right result from the part line |
| 4 | Detect a line but there is a little warping |
| 3 | Detect a line but there are some warpings which can affect the result of CTR |
| 2 | Detect a line but errors are so big |
| 1 | Detect a line but it's the wrong one |
| 0 | Didn't detect this line |

| Image name | Left lung border | right lung border | Left diaphragm | Right diaphragm | Left heart border | Right heart border | CTR |
|---|---|---|---|---|---|---|---|
| CLN001 | 5 | 5 | 4.5 | 4 | 4.5 | 5 | 0.47 |
| CLN006 | 5 | 5 | 5 | 5 | 5 | 4 | 0.37 |
| CLN007 | 5 | 5 | 5 | 4.5 | 4.5 | 5 | 0.49 |
| CLN008 | 5 | 5 | 5 | 5 | 4.5 | 4.5 | 0.42 |
| CLN009 | 4.5 | 4.5 | 5 | 5 | 4.5 | 4.5 | 0.49 |
| CLN015 | 5 | 5 | 5 | 4 | 4.5 | 4.5 | 0.47 |
| CLN018 | 4.5 | 5 | 4 | 4.5 | 4 | 5 | 0.41 |
| CLN019 | 5 | 4.5 | 5 | 5 | 5 | 4.5 | 0.47 |
| CLN020 | 5 | 5 | 5 | 5 | 5 | 4.5 | 0.43 |
| CLN028 | 5 | 5 | 4.5 | 4.5 | 4 | 4.5 | 0.47 |
| CLN031 | 5 | 5 | 4 | 4.5 | 4.5 | 5 | 0.47 |
| CLN032 | 5 | 5 | 4 | 5 | 4.5 | 5 | 0.47 |
| CLN037 | 5 | 5 | 5 | 4.5 | 5 | 5 | 0.54 |
| CLN047 | 5 | 5 | 4 | 4 | 4 | 5 | 0.53 |

-continued

| Image name | Left lung border | right lung border | Left diaphragm | Right diaphragm | Left heart border | Right heart border | CTR |
|---|---|---|---|---|---|---|---|
| CLN050 | 5 | 5 | 4 | 4.5 | 4.5 | 5 | 0.48 |
| CLN051 | 5 | 5 | 4.5 | 4.5 | 4.5 | 5 | 0.53 |
| CLN057 | 5 | 5 | 4.5 | 4.5 | 5 | 5 | 0.48 |
| CLN058 | 5 | 5 | 4 | 4.5 | 5 | 4.5 | 0.44 |
| CLN060 | 4 | 5 | 4 | 5 | 4 | 4.5 | 0.55 |
| ... | ... | ... | ... | ... | ... | ... | ... |
| CLN150 | 5 | 4.5 | 4.5 | 4.5 | 4.5 | 5 | 0.45 |

Figure 8:
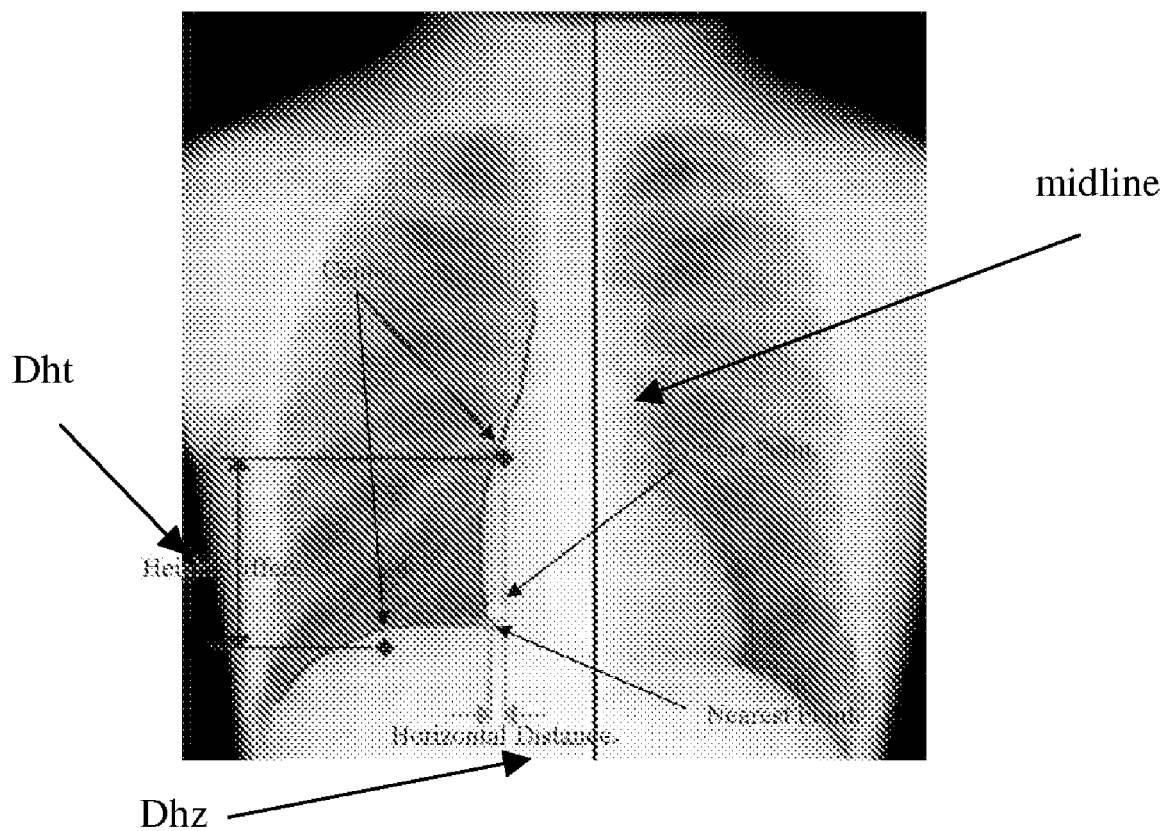
FIG. 8 shows how to confirm the right heart border based on the detected right diaphragm border.

FIG. 8 schematically shows an image processing system in which the method shown in FIGS. 3 and 4 can be implemented. The image processing system shown in FIG. 8 comprises a CPU (Central Processing Unit) 801, a RAM (Random Access Memory) 802, a ROM (Read only Memory) 803, a system bus 804, a HD (Hard Disk) controller 805, a keyboard controller 806, a serial port controller 807, a parallel port controller 808, a display controller 809, a hard disk 810, a keyboard 811, a imager 812, a printer 813 and a display 814. Among these components, connected to system bus 504 are CPU 801, RAM 802, ROM 803, HD controller 805, keyboard controller 806, serial port controller 807, parallel port controller 808 and display controller 809. Hard disk 510 is connected to HD controller 805, and keyboard 811 to keyboard controller 806, imager 812 to serial port controller 807, printer 813 to parallel port controller 808, and display 814 to display controller 809.

Figure 9:
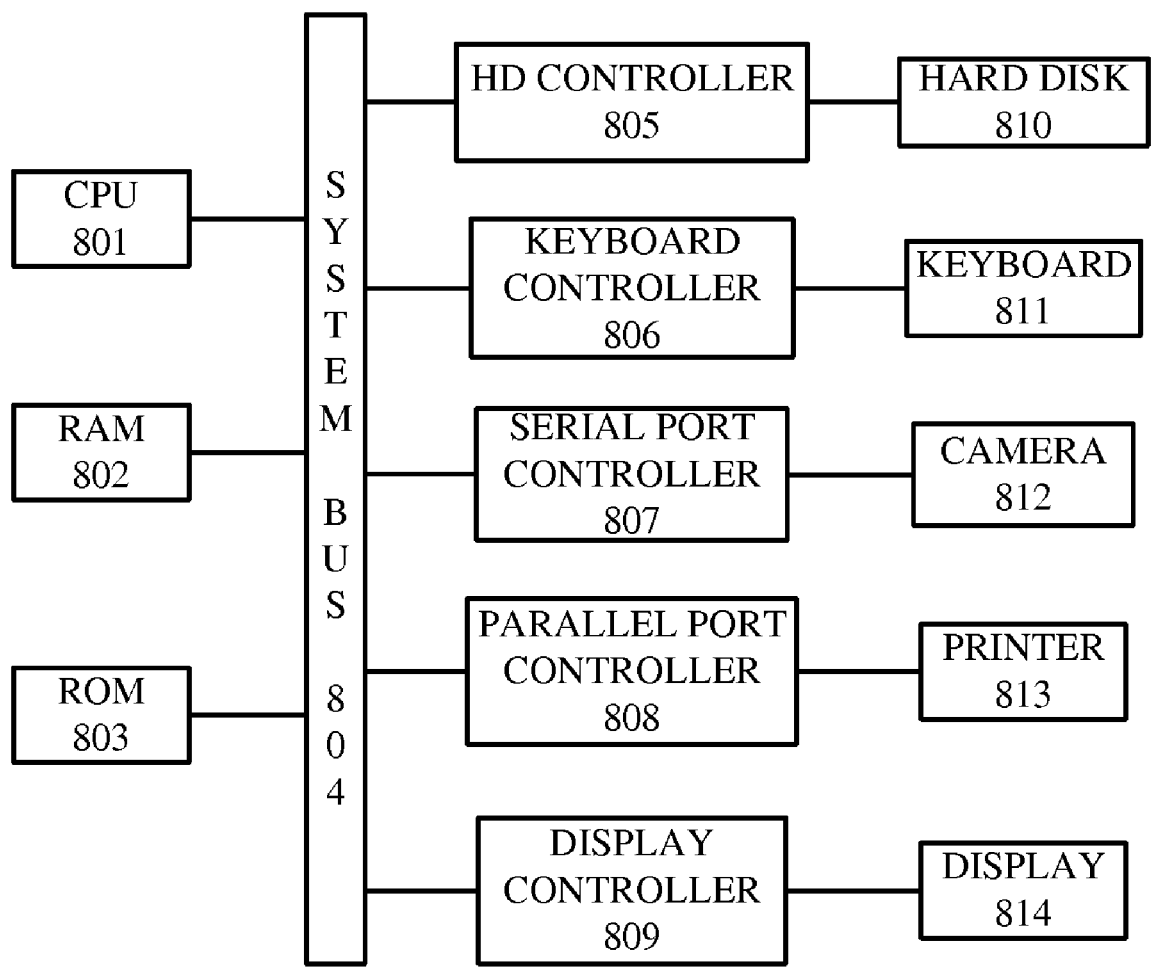
FIG. 9 schematically shows a block diagram of an image processing system for implementing the method of the invention shown in FIGS. 3 and 4.

The functions of each component in FIG. 9 are well known in the art and the architecture shown in FIG. 9 is conventional. Such architecture not only applies to personal computers, but also applies to hand-held devices such as Palm PCs, PDAs (personal data assistants), etc. In different applications, some of the components shown in FIG. 9 may be omitted. If application software is stored in EPROM or other non-volatile memories, HD controller 805 and hard disk 810 could be omitted.

The whole system shown in FIG. 9 is controlled by computer readable instructions, which are usually stored as software in hard disk 810 (or as stated above, in EPROM, or other non-volatile memory). The software can also be downloaded from the network (not shown in the figures). The software, either saved in hard disk 810 or downloaded from the network, can be loaded into RAM 802, and executed by CPU 801 for implementing the functions defined by the software.

It involves no inventive work for persons skilled in the art to develop one or more pieces of software based on the flowcharts shown in FIGS. 3 and 4. The software thus developed will carry out the method of processing an image shown in FIGS. 3 and 4.

In some sense, the image processing system shown in FIG. 9, if supported by software developed based on the flowcharts shown in FIGS. 3 and 4, achieves the same functions as the apparatus for processing image shown in FIG. 5.

The present invention also provides a storage medium encoded with machine-readable computer program code for detecting borderlines in a chest image, the storage medium including instructions for causing a processor to implement the method according to the present invention. The storage medium may be any tangible media, such as floppy diskettes, CD-ROMs, hard drives (e.g., hard disk 810 in FIG. 9).

While the foregoing has been with reference to specific embodiments of the invention, it will be appreciated by those skilled in the art that these are illustrations only and that changes in these embodiments can be made without departing from the principles of the invention, the scope of which is defined by the appended claims.

The present application claims priority benefit of Patent Application 200510077098.1, filed in the People's Republic of China on Jun. 15, 2006. Also, the entire contents of that priori application, and of U.S. application Ser. No. 11/401, 266, filed Apr. 11, 2006, are incorporated herein by reference.

What is claimed is:

1. A method of detecting borders in a chest image, comprising steps of:
    calculating the gray level difference between neighboring pixels of the chest image to get a differential image;
    filtering the differential image to reduce noise and enhance target by at least one filter;
    binarizing the filtered image;
    picking out outside edges of an area with high gray level from the binarized image; and
    determining a final border from the edges according to the character of a border to be found,
    wherein said step of determining a final border from the edges is to determine a right heart border and a left heart border by detecting a right ribcage border and a left ribcage border, detecting a right diaphragm border and a left diaphragm border on the basis of the detected right ribcage border and the detected left ribcage border, and detecting the right heart border and the left heart border on the basis of the detected right diaphragm border and the detected left diaphragm border, to detect a right heart border so that a height difference between a right heart borderline candidate center and a right diaphragm borderline center is not less than 1/32 of the chest image height, and the horizontal difference between the heart borderline candidate center and the point that is the nearest point of the diaphragm borderline from a midline is less than 1/6 of the chest image width.

2. The method according to claim 1, further comprising a step of finding landmark lines of the chest image according to a project profile of the chest image, before said step of calculating the gray level difference.

3. The method according to claim 1, wherein said step of calculating the gray level difference between neighboring pixels of the chest image comprises:
    determining that the direction for calculating the gray level difference between neighboring pixels is from the brighter side of a border to be found to the darker side.

4. The method according to claim 1, wherein said step of calculating the gray level difference between neighboring pixels of the chest image comprises steps of:
    transforming the gray value of the differential image into 0~L gray value space by linear transformation; and
    computing a histogram of the differential image to get a maximum value position MP and stretching the histogram from MP~L to 0~L.

5. The method according to claim 1, wherein said step of filtering the differential image is performed using an average filter and/or a median filter.

6. The method according to claim 5, wherein the filter is chosen according to a border's character.

7. The method according to claim 1, wherein said step of binarizing the filtered image comprises steps of:
defining a region of interest (ROI) according a midline of the chest image;
defining a binary threshold according to the average gray value of the ROI; and
binarizing the filtered image according to the binary threshold.

8. The method according to claim 1, wherein said step of picking out the outside edges comprises the steps of:
determining on which side of a high gray level area a border to be found is located;
finding out the pixels on the edges of the determined side of the high gray level area;
setting the gray level of pixels found on the edges into highest gray level and setting the gray level of other pixels into lowest gray level; and
dilating the image by an operator to ensure connectivity of the edges.

9. The method according to claim 8, wherein the operator is determined according to the character of a border to be found.

10. The method according to claim 1, wherein said step of determining a final border comprises the steps of:
tracing the outside edges to get candidate borders; and
choosing a curve in the candidate borders that has the most proper position information to be the correct border according to the character of former found borders and the character of the border to be found.

11. An apparatus for detecting borders in a chest image, comprising:
means for calculating the gray level difference between neighboring pixels of the chest image to get a differential image;
means for filtering the differential image to reduce noise and enhance target;
means for binarizing the filtered image;
means for picking out outside edges of an area with high gray level from the binarized image; and
means for determining a final border from the edges according to the character of the border to be found,
wherein said means for determining a final border from the edges is to determine a right heart border and a left heart border by detecting a right ribcage border and a left ribcage border, detecting a right diaphragm border and a left diaphragm border on the basis of the detected right ribcage border and the detected left ribcage border, and detecting the right heart border and the left heart border on the basis of the detected right diaphragm border and the detected left diaphragm border, to detect a right heart border so that a height difference between a right heart borderline candidate center and a right diaphragm borderline center is not less than $1/32$ of the chest image height, and the horizontal difference between the heart borderline candidate center and the point that is the nearest point of the diaphragm borderline from a midline is less than $1/6$ of the chest image width.

12. The apparatus according to claim 11, wherein said means for calculating the gray level difference between neighboring pixels of the chest image comprises:
means for determining which side of a border to be found is brighter; and
means for determining that the direction for calculating the gray level difference between neighboring pixels is from the brighter side of the border to be found to the darker side.

13. The apparatus according to claim 11, wherein said means for calculating the gray level difference between neighboring pixels of the chest image comprises:
means for transforming the gray value of the differential image into 0~L gray value space by linear transformation; and
means for computing a histogram of the differential image to get the maximum value position MP and stretching the histogram from MP~L to 0~L.

14. The apparatus according to claim 11, wherein the means for filtering the differential image comprises an average filter or a median filter.

15. The apparatus according to claim 14, wherein said filter is chosen according to a border's character.

16. The apparatus according to claim 11, wherein said means for binarizing the filtered image comprises:
means for defining a region of interest (ROI) according to a midline of the chest image;
means for defining a binary threshold according to the average gray value of the ROI; and
means for binarizing the filtered image according to the binary threshold.

17. The apparatus according to claim 11, wherein said means for picking out the outside edges comprises:
means for determining on which side of a high gray level area a border to be found is located;
means for finding out the pixels on the edges of the determined side of the high gray level area;
means for setting the gray level of pixels found on the edges into highest gray level and setting the gray level of other pixels into lowest gray level; and
means for dilating the image by an operator to ensure connectivity of the edges.

18. The apparatus according to claim 17, wherein the operator is determined according to the character of the border to be found.

19. The apparatus according to claim 11, wherein said means for determining a final border comprises:
means for tracing the outside edges to get the candidate borders; and
means for choosing a curve in the candidate borders that has the most proper position information to be the correct border.

20. A non-transitory computer-readable storage medium storing a computer program which implements a method according to any one of claims 1 to 10.

* * * * *